(12) United States Patent
Glenn (10) Patent No.: US 11,997,126 B1
(45) Date of Patent: *May 28, 2024

(54) SYSTEMS AND METHODS FOR DYNAMIC SECURITY MICRONETWORK PROTECTION OF NETWORK CONNECTED DEVICES

(71) Applicant: CABLE TELEVISION LABORATORIES, INC., Louisville, CO (US)

(72) Inventor: Michael Glenn, Golden, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 368 days.

This patent is subject to a terminal disclaimer.

(21) Appl. No.: 17/195,246

(22) Filed: Mar. 8, 2021

Related U.S. Application Data (63) Continuation of application No. 16/591,459, filed on Oct. 2, 2019, now Pat. No. 10,944,780, which is a continuation of application No. 15/443,855, filed on Feb. 27, 2017, now Pat. No. 10,440,043.

(60) Provisional application No. 62/300,641, filed on Feb. 26, 2016.

(51) Int. Cl.
  *G06F 21/60* (2013.01)
  *H04L 9/40* (2022.01)

(52) U.S. Cl.
  CPC ........ *H04L 63/1433* (2013.01); *G06F 21/606* (2013.01); *H04L 63/0272* (2013.01)

(58) Field of Classification Search
  CPC  H04L 63/1433; H04L 63/0272; G06F 21/606
  USPC ....................................................... 713/168
  See application file for complete search history.

(56) References Cited

U.S. PATENT DOCUMENTS

| | | |
|---|---|---|
| 7,484,008 B1 | 1/2009 | Gelvin et al. |
| 9,027,138 B2 | 5/2015 | Glenn et al. |
| 9,215,075 B1 | 12/2015 | Poltorak |
| 9,419,842 B1 | 8/2016 | Galliher, III et al. |
| 9,531,835 B2 | 12/2016 | Wynn et al. |
| 9,686,199 B2 | 6/2017 | Anand |
| 10,749,796 B2 | 8/2020 | Dowlatkhah et al. |
| 11,284,258 B1 | 3/2022 | Wei et al. |
| 11,671,829 B1 | 6/2023 | Radhakrishnan et al. |

(Continued)

FOREIGN PATENT DOCUMENTS

WO   2018015425 A1   1/2018

OTHER PUBLICATIONS

Namal et al., IEEE 2014 Eighth International Conference on Next Generation Mobile Applications, Services and Technologies, "SDN Core for Mobility Between Cognitive Radio and 802.11 Networks", pp. 272-281 (Year: 2014).*

(Continued)

*Primary Examiner* — Khalil Naghdali
(74) *Attorney, Agent, or Firm* — Josh C. Snider; Snider IP (57) ABSTRACT

Dynamic Software Defined Networking (DSDN) systems and methods provide secure and isolated subnetworks within a larger network. Each subnetwork may be formed with varied policies and communication restrictions based on at least device type, device grouping, and risk level. The DSDN systems and methods may also be applied to form a network, with or without subnetworks, of devices that are spatially separated, thereby reducing the attack surface of the DSDN-formed network.

21 Claims, 8 Drawing Sheets

(56) References Cited

U.S. PATENT DOCUMENTS

| | | |
|---|---|---|
| 2010/0100930 A1 | 4/2010 | King |
| 2010/0262988 A1 | 10/2010 | Bauer et al. |
| 2011/0196837 A1 | 8/2011 | Savunen et al. |
| 2011/0302248 A1 | 12/2011 | Garrett et al. |
| 2012/0210001 A1 | 8/2012 | Ryerson et al. |
| 2014/0123211 A1 | 5/2014 | Wanser et al. |
| 2014/0162629 A1 | 6/2014 | Tipton et al. |
| 2014/0281029 A1 | 9/2014 | Danforth |
| 2015/0249548 A1* | 9/2015 | Rasband ............... G01S 13/876 370/254 |
| 2016/0134488 A1 | 5/2016 | Straub et al. |
| 2016/0234213 A1 | 8/2016 | Kim et al. |
| 2016/0350095 A1 | 12/2016 | Ramachandran et al. |
| 2016/0373319 A1 | 12/2016 | Littlejohn et al. |
| 2017/0048700 A1 | 2/2017 | Huang et al. |
| 2017/0308395 A1 | 10/2017 | Cook et al. |
| 2017/0311368 A1 | 10/2017 | Kandur Raja et al. |
| 2018/0024537 A1 | 1/2018 | Chauvet et al. |
| 2018/0123932 A1 | 5/2018 | Shaw et al. |
| 2018/0316730 A1 | 11/2018 | Schaefer et al. |
| 2019/0021125 A1 | 1/2019 | Bischinger |
| 2019/0149987 A1 | 5/2019 | Moore |
| 2020/0394332 A1 | 12/2020 | Jakobsson et al. |
| 2021/0144517 A1 | 5/2021 | Bernat et al. |
| 2023/0025898 A1 | 1/2023 | Kaplan et al. |
| 2023/0141055 A1 | 5/2023 | Kim et al. |

OTHER PUBLICATIONS

Ahearne et al., "Software Defined Control of Tunable Optical Transceivers using NETCONF and YANG", 2018 European Conference on Networks and Communications (EuCNC): Network Softwarisation (NET) pp. 81-86 (Year: 2018).

Bifulco et al., "A practical experience in designing an OpenFlow controller", 2012 European Workshop on Software Defined Networking, pp. 61-66 (Year: 2012).

Karmakar et al., "On the Design and Implementation of a Security Architecture for End to End Services in Software Defined Networks," 2016 IEEE 41st Conference on Local Computer Networks, pp. 519-522 (Year: 2016).

Medved et al., "OpenDaylight: Towards a Model-Driven SDN Controller Architecture", IEEE Conferences [ Jun. 1, 2014] Proceeding of IEEE International Symposium on a World of Wireless, Mobile and Multimedia Networks 2014 (pp. 1-6) (Year: 2014).

Nguyen et al., "Software-defined model for IoT clusters: enabling applications on demand", 2018 IEEE, pp. 776-781 (Year: 2018).

\* cited by examiner

SYSTEMS AND METHODS FOR DYNAMIC SECURITY MICRONETWORK PROTECTION OF NETWORK CONNECTED DEVICES

RELATED APPLICATIONS

This application is a continuation of U.S. application Ser. No. 16/591,459, which was filed on Oct. 2, 2019. U.S. application Ser. No. 16/591,459 is a continuation of U.S. application Ser. No. 15/443,855, filed Feb. 27, 2017, now U.S. Pat. No. 10,440,043, which prior application claims the benefit of and priority to U.S. Provisional Patent Application Ser. No. 62/300,641, filed Feb. 26, 2016, the disclosures of all of which are incorporated herein by reference in their entireties.

BACKGROUND

Network operators have been dealing with infected subscriber's devices for more than 15 years. Many operators have botnet notification and remediation systems in place to identify and mitigate infected devices on their network. A description of such systems is described in RFC 6561 on Recommendations for the Remediation of Bots in ISP Networks. Such systems have been in production since 2005. One patent for identifying infected devices is described in U.S. Pat. No. 9,027,138.

SUMMARY OF THE INVENTION

Dynamic Software Defined Networking (DSDN) can be used to provide network level security protections for different types of devices, such as a network of Internet of Things (IoT) devices or other systems of wired and or wirelessly interconnected devices.

Devices that no longer have security patches or are infected with malware can be either quarantined, or their network traffic can be limited to only approved network destination points.

For devices with strong security, DSDN can be used to create VPN tunnels to add a layer of defense. For example, DSDN could be used to identify a network connected insulin pump with an embedded Public Key Infrastructure (PKI) certificate, look up the appropriate network connects (doctor's office and/or medical cloud), and create a VPN tunnel to the approved network locations.

BRIEF DESCRIPTION

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION OF THE FIGURES

The present invention utilizes a subnetwork organization and isolation system and method for protecting computer systems, computing capable devices, and computer networks. This system and method prevents the infections of susceptible devices, dynamically isolates infected devices for administrator notification and manual or automated remediation, and provides for infected devices to remain in use, albeit in a limited fashion, without significant impact to the operator or other devices on the network. Providing for infected devices to remain in use is accomplished by isolating the infected or otherwise vulnerable devices into an isolation subnetwork. One exemplary isolation subnetwork is a limited access subnetwork which only provides for a narrow selection of communications or amount of data to transfer to and/or from the device. Another exemplary isolation subnetwork is a complete isolation subnetwork, which effectively walls of the device from the rest of the network and subnetworks until remediation may occur.

Dynamic Software Defined Networking (DSDN) system can be used to provide bot network level and device level security protections for a wide array of devices and systems, including but not limited to IoT devices, mobile devices, computers, routers, extenders, etc. Devices for which security patches are no longer available or devices that are infected with malicious software, such as malware or botnet software, may be either quarantined or isolated. Alternatively, such devices mayor have their network traffic controlled by the DSDN system, for example, limited to only approved network and subnetwork destination points, to approved network traffic types and/or flows, or by capping the amount of data flow for a predetermined period.

For devices with strong security, DSDN system can be used to create VPN tunnels to add a layer of protection to a devise and devices to which they are connected. In one example, DSDN system identifies a network connected medical device, such as an insulin pump configured with an embedded PKI certificate. The DSDN system determines the appropriate network connects (e.g., a doctor's office and/or a medical cloud), and creates a Virtual Private Networking (VPN) tunnel to the approved network location(s).

In an embodiment, the present DSDN system may create layers of protection for devices by configuring dynamic VPNs to stop malicious traffic from connecting to DSDN system protected devices. Furthermore, privacy is enhanced when utilizing the present DSDN system to preventing the theft of data from snooping devices listening to network traffic. This is accomplished, for example, by isolating devices in a home Wi-Fi environment and by utilizing VPN Tunnels (e.g., GRE or IPSEC). These snooping devices may be standalone devices put in place by a third party or may have been installed by the owner of the network but taken over (e.g., infected with snooping software) by a malicious third party. Such infected devices may be quarantined by the present DSDN systems and methods such that the device's network traffic is partially or completely separated or otherwise isolated from that of other devices on the network and potentially the internet.

If a network operator maintains a botnet notification and remediation system any infected device traffic may be tunneled for an administrator (also called here, "a user") notification and remediation. For infection susceptible devices, for example, that are no longer supported with security patches, the device's network traffic may be dynamically configured to only route to approved locations, one example of which is an over-the-top video provider, the device's manufacturer, etc.

The present technology is not limited to the home use and may also be applied by any network operator and their operation.

The present invention may also provide a customer of a video network operator with an improved broadband experience. For example, for IPTV or over-the-top video services, the present system and method provides functionality to minimize the impact that home network traffic has on the video experience. It may also reduce operating costs associated with infected devices providing a network environment which they may exist in while protecting the rest of the network from infection.

Figure 1A:
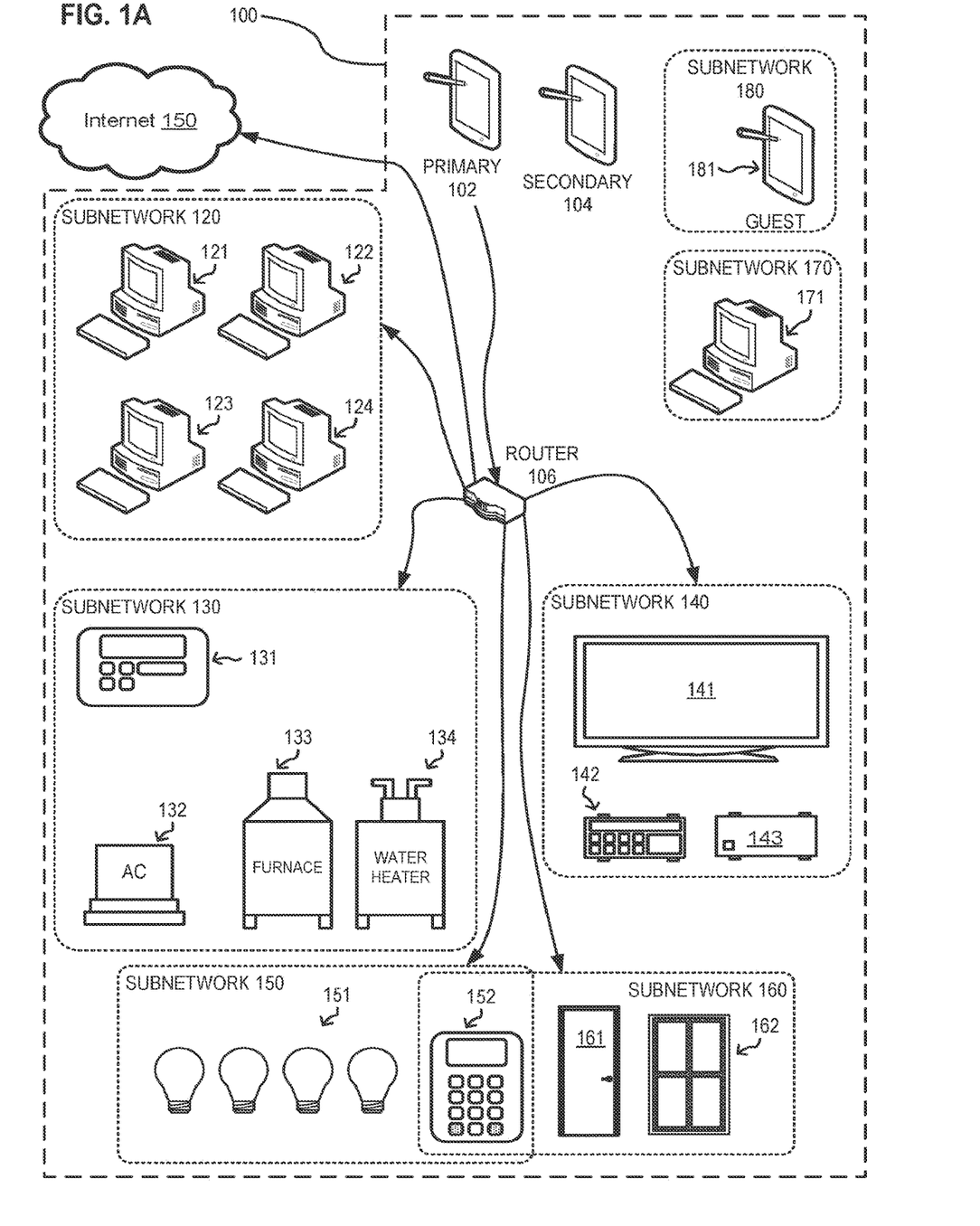
FIG. 1A shows one exemplary Dynamic Software Defined Network (DSDN) connected to the internet, including exemplary subnetworks, and representing primary device communications, in an embodiment.

FIG. 1A shows a DSDN 100 (also call "network 100" herein) connected to the internet 190 and including exemplary subnetworks 120-180 (also called "limited access networks"), a router 106, a primary interconnected device 102, and a secondary interconnected device 104. Primary device 102 is pictorially represented as connected to subnetwork 120—subnetwork 160 via router 106. Subnetwork 120 includes four computer systems 121-124. Subnetwork 130 includes a smart thermostat 131, a smart AC unit 132, a smart furnace 133, and a smart hot water heater 134. Intelligence in these (and any other) devices may be integrated upon manufacture or may be added as an add-on post manufacture. Subnetwork 140 includes a smart TV 141, an A/V receiver 142, and an amplifier 143. Subnetwork 150 includes smart light bulbs 151 and a smart hub 152. Subnetwork 160 shares smart hub 152 with subnetwork 150 and includes IoT enabled door 161, and window 162. Any of these devices may include a plurality of IoT or smart devices, for example door 161 may include a smart lock, a smart doorbell, and a smart door opening sensor. Subnetwork 150 and/or subnetwork 160 may also include other smart or IoT devices such as smart light and fan switches, motion detectors, security cameras, moisture detectors, window shades, weather stations, etc., all of which are not shown but are contemplated. Subnetwork 170 includes a computer system 171. Subnetwork 180 includes a guest device 181, such as but not limited to a guest smart phone, guest computer system, or guest tablet.

Communication may come directly from primary device 102 to a subnetwork or a member of a subnetwork, or may be facilitated by networks 100's router 106. In the example of FIG. 1A, DSDN 100 is configured such that primary device 102 may access subnetworks 120-160 via router 106. Secondary device 104 has not been provisioned into network 100, and therefore is not in communication with any device or subnetwork within network 100. Subnetworks 170-180 are shown isolated from all other subnetworks/devices in network 100. That is, there is no communication between isolated subnetworks 170, 180 and any other device or the internet 190. In one example, for subnetwork 170 this may be that computer device 171 is infected with malicious software. In another example, for subnetwork 180 this may be because guest device 181 is currently not trusted.

In the embodiment of network 100, all devices within a subnetwork may intercommunicate with other devices in the same subnetwork, but are partially or wholly isolated from devices outside their respective subnetwork, unless device or subnetwork is specifically configured to communicate with a device or subnetwork outside the respective subnetwork. One example of a cross subnetwork communication is subnetworks 150 and 160, which share smart hub 152. In this embodiment, smart light bulbs 151 may communicate with smart hub 152 and door 161 and window 162 may communicate with smart hub 152, but smart bulb 151, door 161 and window 162 may not communicate with each other. In a separate embodiment smart hub 152 (or router 106) may act as a policy enforcing intermediary which only allows certain communications between devices in subnetwork 150 and subnetwork 160. Such communications may be maintained in a list of allowed communications on smart hub 152 or router 106 or enforced utilizing known techniques. Another example of cross subnetwork communication is between subnetwork 160 and subnetwork 130. For example, if door 161 and window 162 are open, communication and coordination between subnetworks 160 and 130 may be initiated to heat or cool a home in which network 100 exists. For example, hub 152 may communicate with primary device 102 to notify the user that heating is not optimized due to open windows and or doors.

It will be understood that subnetworks may be organized by device type such that only devices that should communicate with one another do so and device that are not design to communicate with one another do not. For example, subnetwork 130 may be considered an HVAC subnetwork which supports heating and air conditioning smart devices and subnetwork 140 may be considered an Audio/Video subnetwork which supports only AV equipment. If, for example, smart furnace 133 were infected with foreign or malicious software which tried to duplicate itself throughout DSDN 100 the subnetwork structure of DSDN 100 would limit the malicious software to only subnetwork 130. Furthermore, if furnace 133 tried to communicate with receiver 142 for purposes of duplicating itself, then DSDN 100 would note the unusual communication attempt and may initiate an analysis of furnace 133, which may result in further isolation and remediation prior to incorporating furnace 133 back into subnetwork 130.

It will be understood that the present system and method may be implemented on a service provider (e.g., Comcast) implemented DSDN capable system or in a DSDN cloud. DSDN functionality may also be distributed between a service provider the service provider implemented system, the DSDN cloud and the DSDN capable router.

Figure 1B:
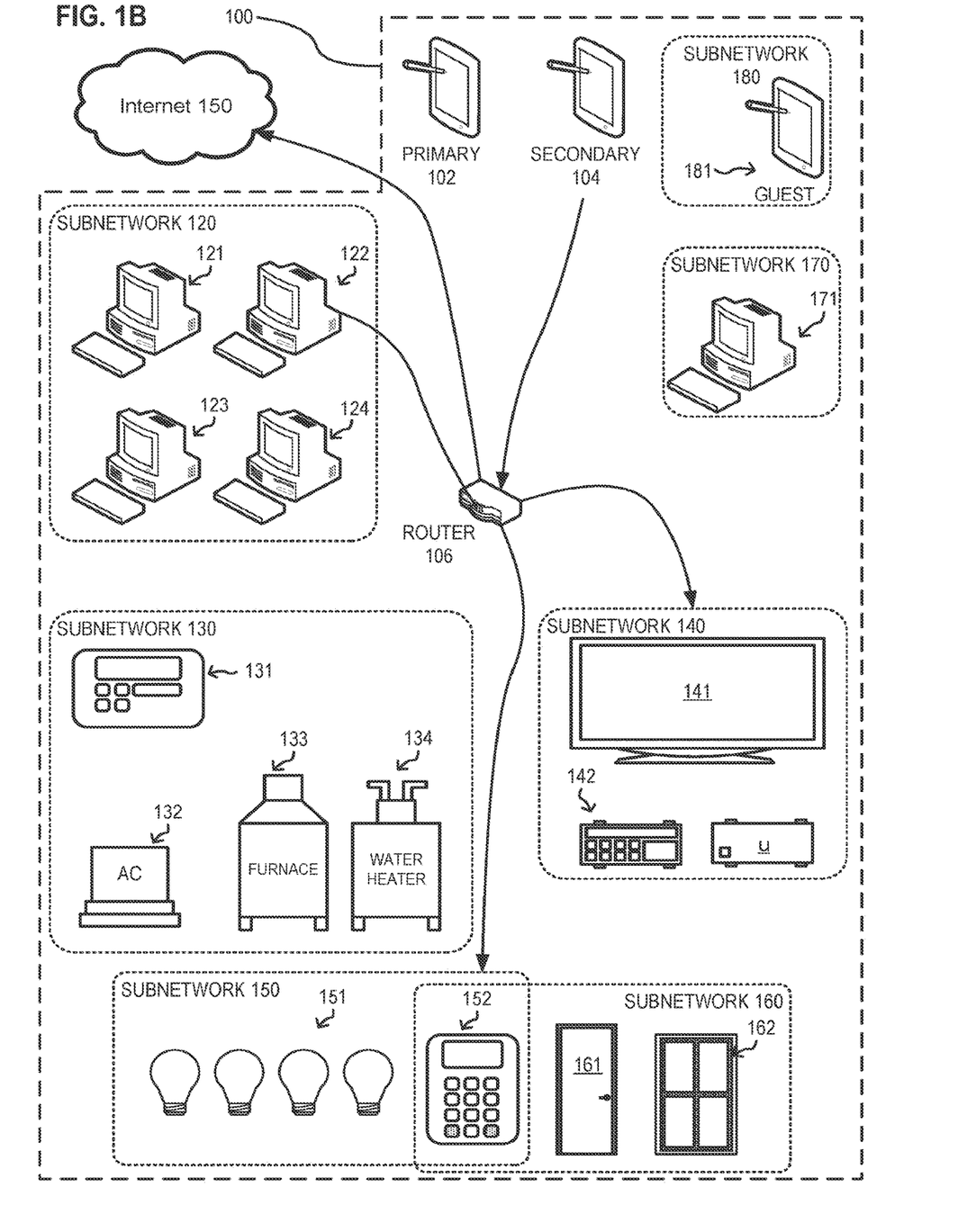
FIG. 1B shows the DSDN of FIG. 1 with secondary device communication connections represented after the provisioning of a secondary device, in an embodiment.

FIG. 1B shows DSDN 100 of FIG. 1 with communication connections for secondary device 104 after device 104 is provisioned into network 100. DSDN 100 provides device 104 with communication to computer 122 of subnetwork 120, to subnetworks 140 and 150, and the internet all via router 106. Secondary device 104 may be, for example, a child who lives in the home in which DSDN 100 in implemented. Because of this, device 104 is not provided access to house hold systems such as the HVAC system supported by subnetwork 130. Furthermore, device 104 is only provided access to computer 122, which may be, for example, the child's computer. It will be understood that DSDN 100 is a dynamic network such that access for device 104 may be changed and that change may be DSDN 100 implemented or may be manually configured by an administrator, for example by the user of primary device 102.

Dynamic reconfiguration of DSDN 100, subnetworks 120-180, and communication access may be triggered by a DSDN operated scheduler. One example of this type of scheduling is primary device 102 programming device 104's access to devices or subnetworks within DSDN 100. This may include restricting device 104's access to AV subnetwork 140 on school nights to after 6 PM. Alternatively, or additionally, device 104's access to devices or subnetworks within DSDN 100 may be event driven. One example of such an event driven control is the submission or upload of the child's homework via device 104 or computer 122 to a homework submission website or server which may cause DSDN 100 to provide device 104 access to AV subnetwork and optionally to provide computer 122 broader access to the internet and access to e-mail, text, etc. Another example is the detection of malicious software on one or more devices of DSDN 100 or within a subnetwork 120-180. Another example is the notification by a trusted source, e.g., manufacturer of thermostat 131, that a software update is available.

Figure 1C:
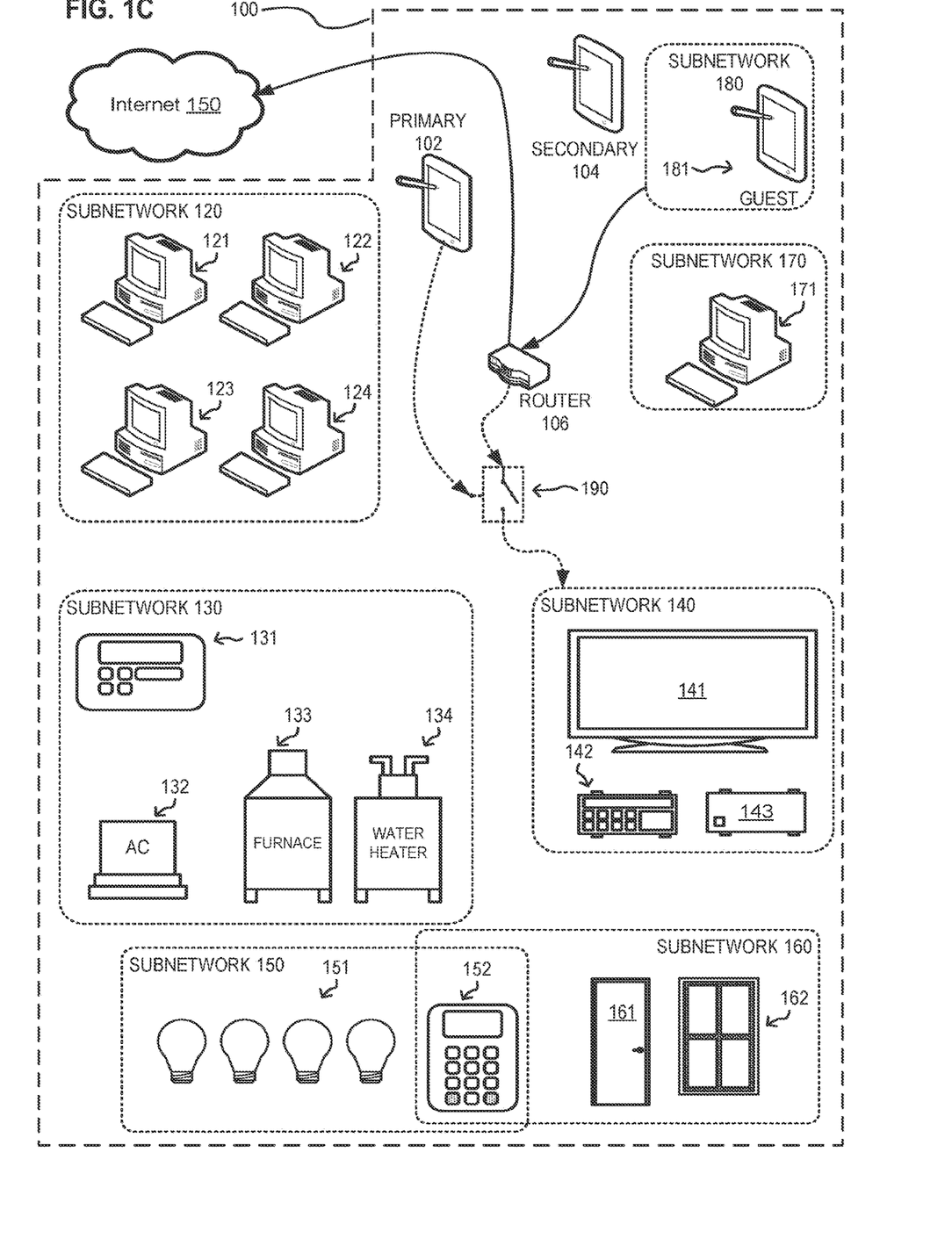
FIG. 1C shows the DSDN of FIG. 1 with guest device communication connections represented after the provisioning of a guest device into the DSDN, in an embodiment.

FIG. 1C shows DSDN 100 of FIG. 1 with communication connections for guest device 181 after guest device 181 on subnetwork 180 is provisioned into DSDN 100. FIG. 1C also includes a symbolically represented switch 190, discussed further below. Because device 181 is a guest device it is provided limited access to DSDN 100 support devices and subnetworks. This is to protect DSDN 100 devices and subnetworks from potential infection that may be introduced by guest device 181. This also protects guest device 181 from any viruses or malicious software that may be on a DSDN 100 device, for example furnace 133.

In FIG. 1C, guest device 181 is provided access to the internet 190 and access to AV subnetwork 140. Guest device 181 is provided primary device 102 controlled access to subnetwork 140. Control by primary device 102 is symbolically represented by device 102 controlling switch 190. Switch 190 may be implemented as a physical switch, as software within router 106, or by another system or method that would be apparent to one skilled in the art after reading the present disclosure.

Figure 2:
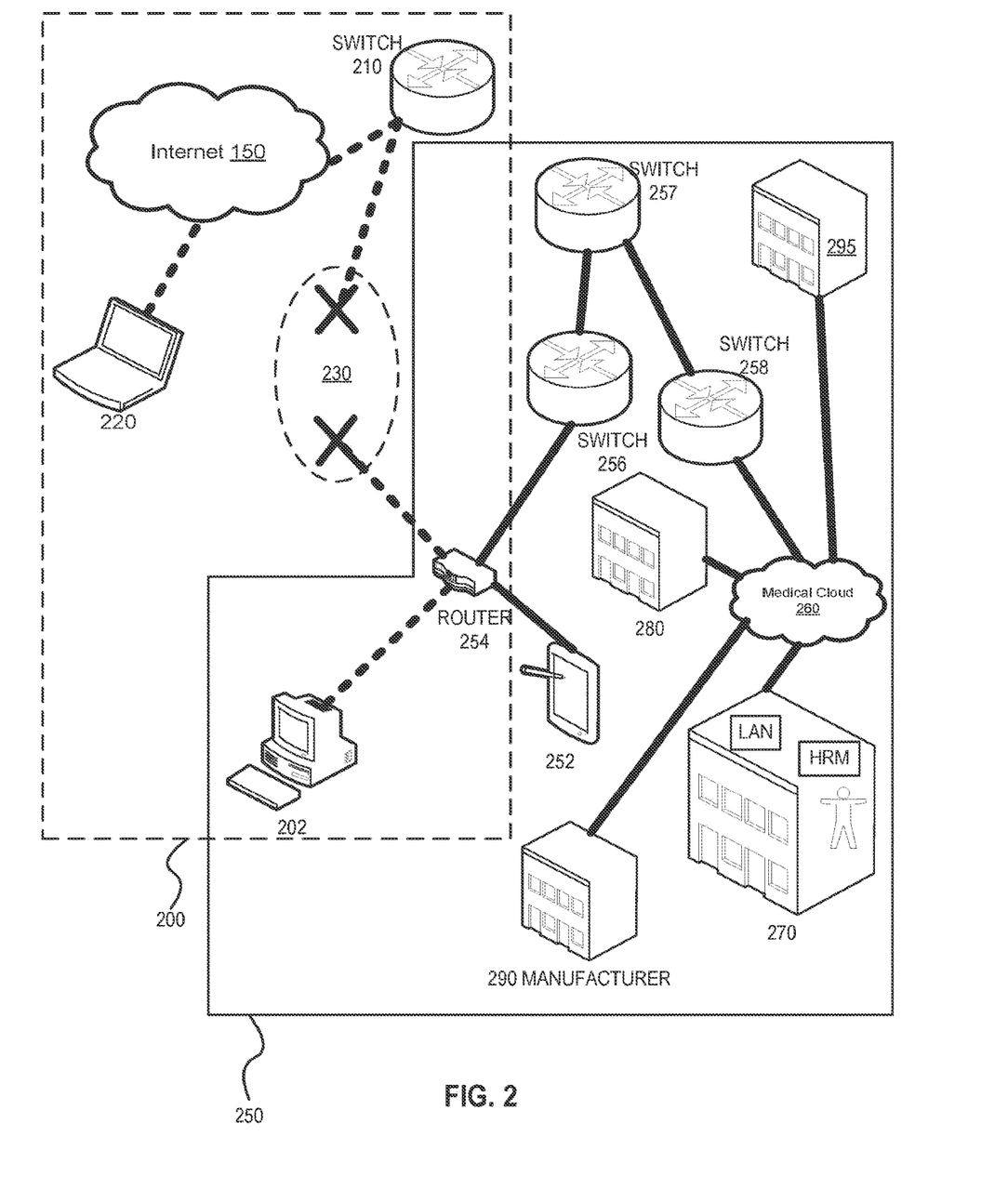
FIG. 2 shows a medical subnetwork in communication with a residence subnetwork, which utilizes a partial isolation protocol, in an embodiment.

FIG. 2 shows two subnetworks, subnetworks 200 and 250, which are examples of subnetworks forming communication subnetworks, such as subnetwork 250, and isolation subnetworks, such as subnetwork 200.

Both subnetworks 200 and 250 are formed of devices which are in communication via router 254, but are not co-located. In the example of subnetwork 250 a device 252 is in communication with a medical cloud 260, a doctor office 270, a hospital 280, device manufacturer 290, and service provider (e.g., Comcast) via a router 254 and switches 256-258, which together form an isolated subnetwork 250. Such a connection may utilize a VPN to connect a computer 202 and doctor's office 270, thereby forming a new network, not shown. This new network may include medical devices, such as an insulin pump (not shown), which may be controlled or monitored from one or both of medical cloud 260 and doctor's office 270. The present system and method provides for spatially distributed devices to exist on the same secure network (and in some cases, on different networks) with limited to no risk of the system being compromised by at least reducing the network attack surface.

Subnetwork 200 forms one embodiment of an isolate subnetwork, formed of a computer 202, a switch 210, computer 220, and router 254, which is share with subnetwork 250. Subnetwork 200 is shown with a symbolic disconnect 230 between switch 210 and router 254, which isolates computer 220 from computer 202 and subnetwork 250. This may be a physical disconnect, for example implemented by a switch like switch 210, or may be implemented in software, for example within router 254, a DSDN orchestration, by a VPN tunneling, or by a combination of any of these.

In an alternative embodiment (not shown), computer 220 may be placed in an isolation subnetwork that is separate from one or both of computer 202 and switch 210 and subnetwork 250.

Figure 3:
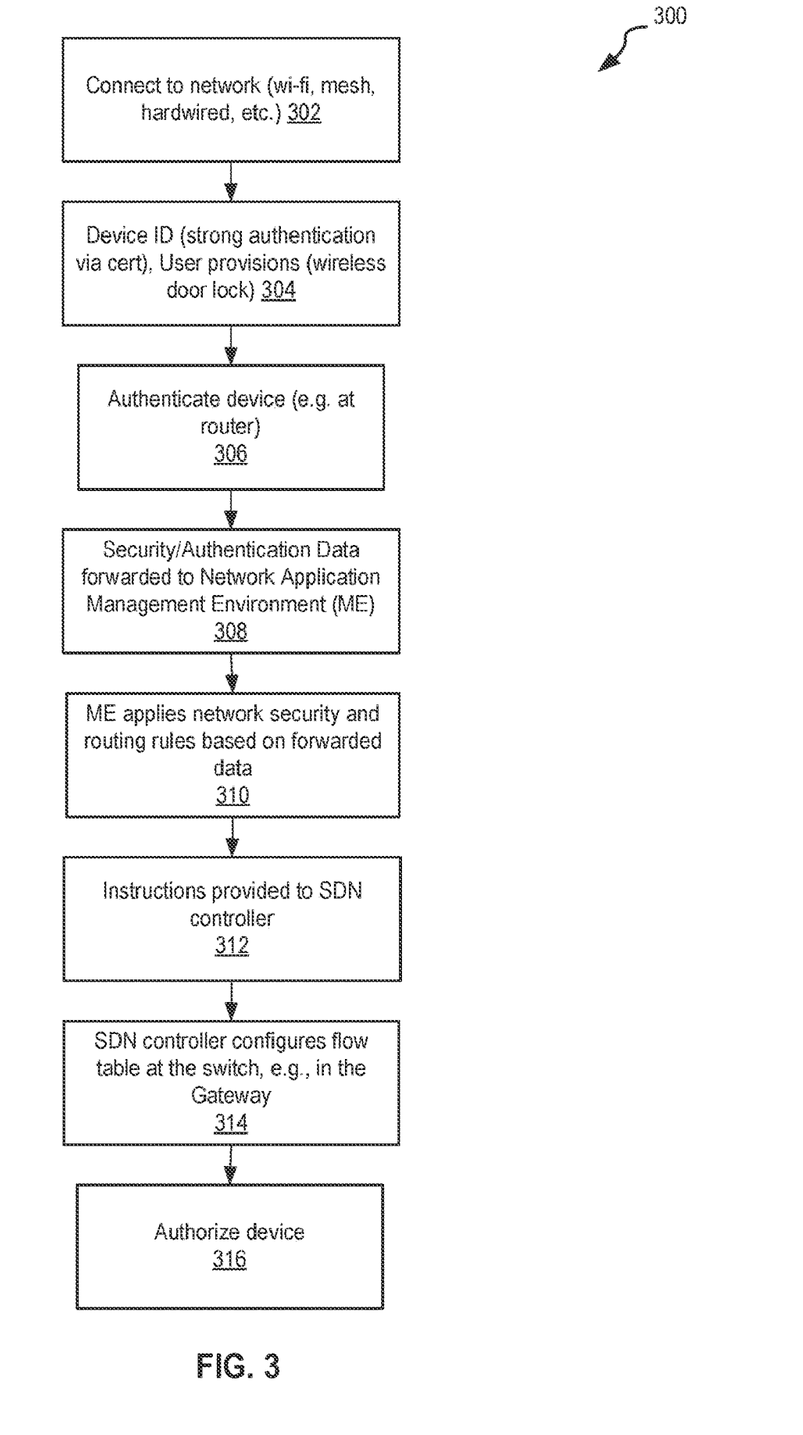
FIG. 3 shows one exemplary provisioning process, in an embodiment.

FIG. 3 shows one exemplary provisioning process 300 for provisioning a new device onto a DSDN.

In step 302 of method 300, a device to be provisioned (hereinafter, "the device") is connected to the network via a wireless or wired connection. One example of step 302 is guest device 181 of FIG. 1C wireless connection to router 106 of DSDN 100.

In step 304 of method 300, authentication data from the device is transferred to a DSDN capable system. This step may be the transfer of a strong authentication via a cert or may be accomplished by a manual process performed by the administrator of the DSDN. One example of step 304 is transmitting a strong authentication via a certificate or SIM card or user name and password to router 106, the user's service provider, or a DSDN cloud service.

In step 306 of method 300, step 304 data is utilized to authenticate the device. One example of step 306 is DSDN capable router 106 connecting to internet 190 to authenticate guest device 181 via the provided certificate.

In step 308 of method 300, the security/authentication data is forwarded to a network application management environment for processing. One example of step 306 is guest device 181's cert, username and password data, or SIM card data being forwarded to router 106, the user's service provider, or a DSDN cloud service.

In step 310 of method 300, the management environment applies network security and routing rules to guest device 181 based on the provided data. One example of step 308 is router 106, the use's service provider, or a DSDN cloud service generating instructions for guest device 181 within network 100 to limit access by guest device 181 to network 100 resources.

In step 312 of method 300, instructions are provided to DSDN controller based on the data provided and processed in the above steps. One example of step 308 is router 106, the use's service provider, or a DSDN cloud service providing the generated instructions to network 100 to implement the instructions.

In step 314 of method 300, a DSDN controller configures a flow table at a switch, e.g., in a gateway or a router. One example of step 312 is a DSDN controller within DSDN capable router 106 configures a flow table within router 106 to control data flow to and from guest device 181.

In step 316 of method 300, the device is authorized. One example of step 316 is guest device 181 being authorized by DSDN capable router 161, the user's service provider, or a DSDN cloud service.

Figure 4:
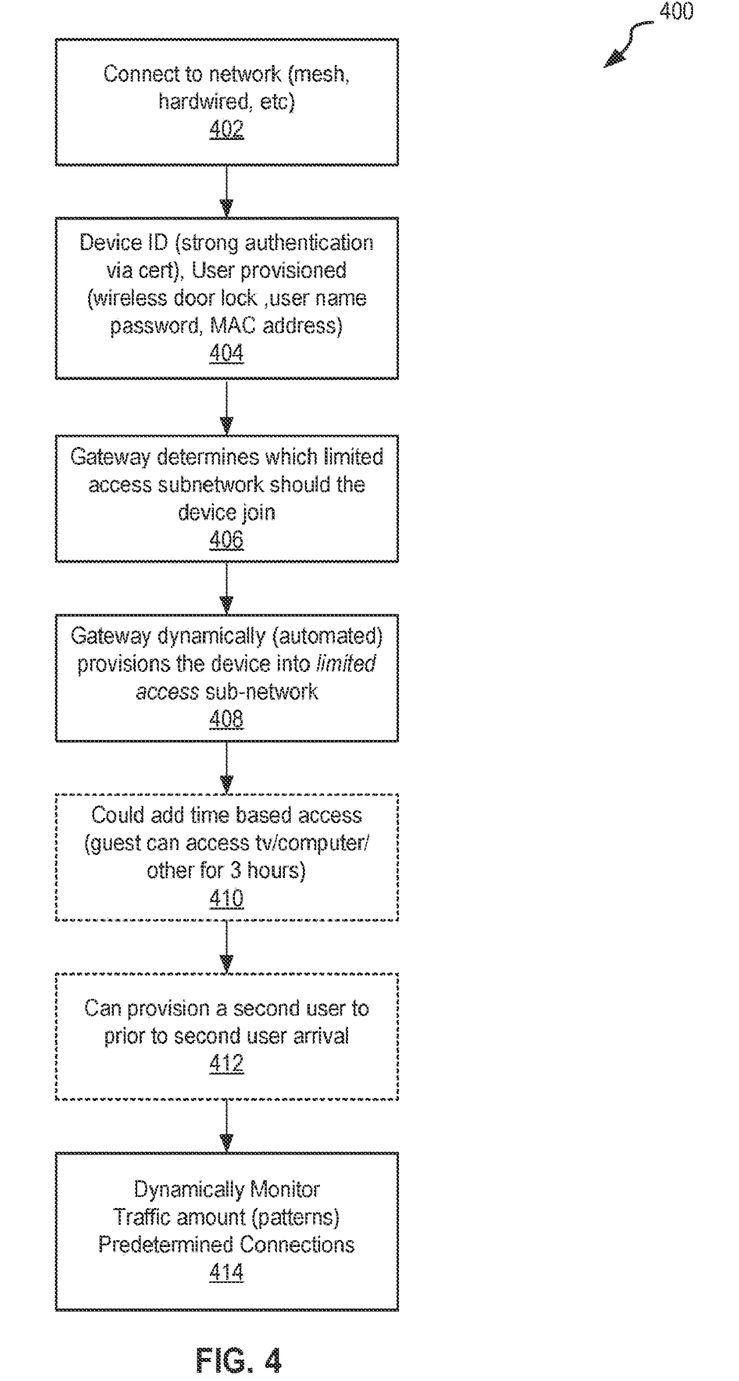
FIG. 4 shows another exemplary provisioning process, in an embodiment.

FIG. 4 shows another exemplary provisioning process, process 400, for provisioning a new device into a DSDN such as DSDN 100 of FIGS. 1A-C. The bulk of the examples here are directed to a wireless door lock.

In step 402 of method 400, a device to be provisioned (hereinafter, "the device") is connected to the network via a wireless or wired connection. One example of step 402 is connecting a wireless door lock associated with door 161 of FIG. 1A to router 106 of DSDN 100.

In step 404 of method 400, authentication data from the device is transferred to the DSDN system, where the authentication data is processed. Transferring authentication data may be automatically or manually transferring a strong authentication via a cert or may be accomplished by an automatic or manual process performed by the administrator of the DSDN, for example, relying on user name and password, MAC address, or some other mechanism known in the art. One example of step 304 is the device transmitting its cert. to the router which in turn forwards the cert to the user's service provider, where the cert is processed and the device is authenticated.

In step 406 of method 400, the user's service provider, a gateway, or some other DSDN capable device determines which limited access subnetwork the new device will exist in. One example of step 306 is DSDN capable router 106 or the user's service provider determining that a new door 161 associated door lock will exist within subnetwork 160.

In step 408 of method 400, the DSDN capable device dynamically provisions the device into the step 406-determined limited access subnetwork. One example of step 408 is DSDN capable router 106 associating door 161 associated door lock with subnetwork 160.

In optional step 410 of method 400, the association is given a temporal limitation. For example, the association expires after a predetermined amount of time, or can only be accessed by designated devices or user during predetermined time periods. One example of optional step 410 is providing guest device 181 with a time based expiring access to DSDN 100. In another example of step 410, DSDN capable router 106 provides access to AV subnetwork 140 only between 6:00 PM and 7:00 PM on week nights.

In optional step 412 of method 400, the device is provisioned while the device is remote from DSDN 100 and router 106. This provides for the device to have immediate access to resources within DSDN 100 when it is within wireless communication distance from router 106 or when it is plugged into router 106. Examples of optional step 412 include remotely accessing router 106 and/or DSDN 100 to provision door 161 associated wireless door lock at time of purchase or guest device 181 in DSDN 100 or an appropriate subnetwork.

In step 414 of method 400, DSDN dynamically monitors traffic amount and/or patterns to predetermined connections to ensure proper functioning and to determine the presence of undesired software within the DSDN. One example of step 414 is DSDN capable router 106 monitoring all traffic within DSDN 100 to if traffic amounts and patterns vary that that expected the be DSDN configured devices. If it is determined that traffic amounts and/or patterns do vary from that expected, DSDN capable router 106 may initiate an analysis of the infringing device to confirm the presence of malicious software. If malicious software is found, remediation process are activated, such as isolating the device to an newly generated isolation subnetwork, which restricts or eliminates traffic flow depending on the necessity of the device. Malicious software removal steps may also be taken.

Figure 5:
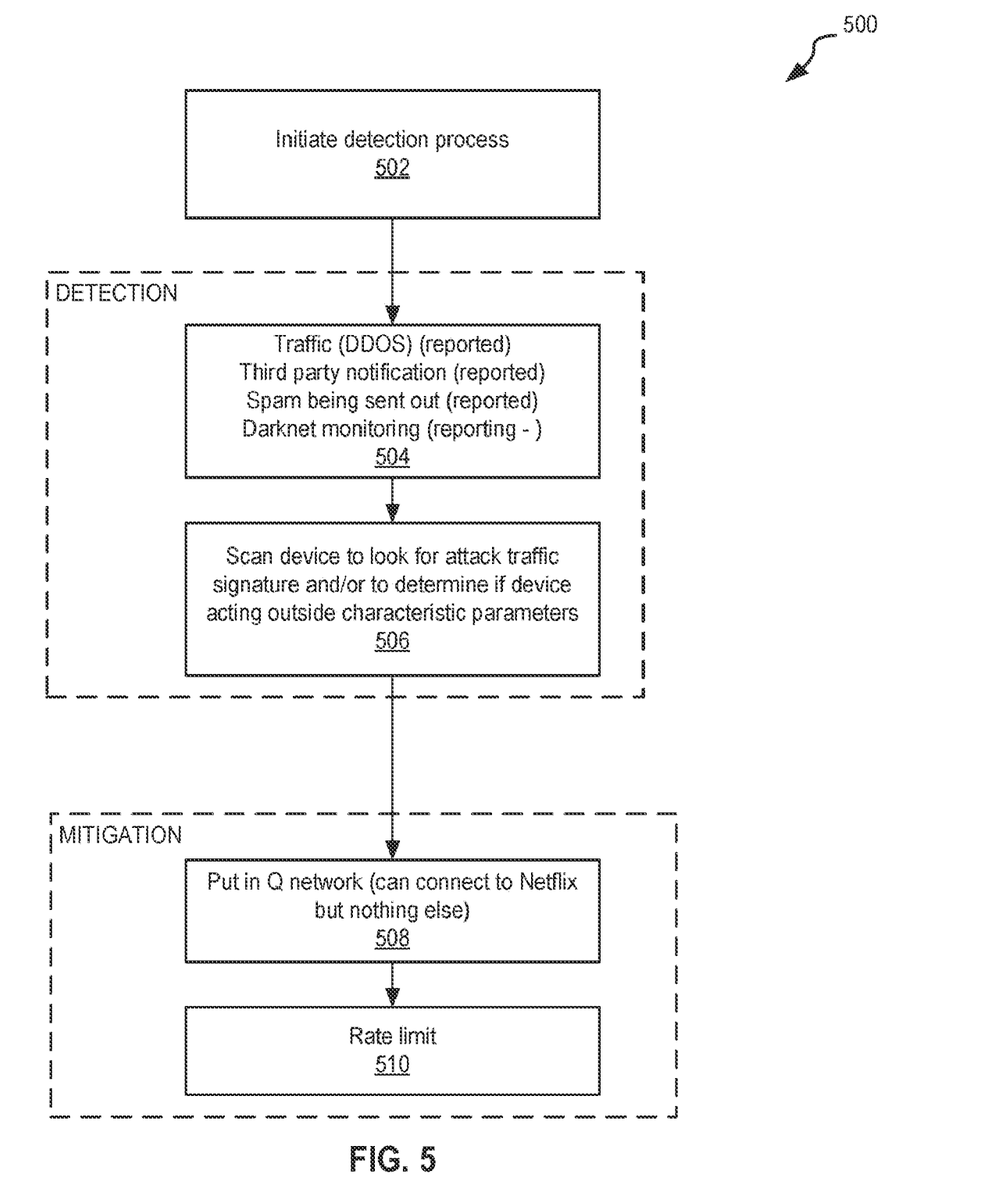
FIG. 5 shows one exemplary remediation process, in an embodiment.

FIG. 5 shows one exemplary remediation process 500, for remediating a device within the DSDN that is determined to have been infected by malicious software.

Step 502 of method 500 initiates a detection process to determine if a device is infected. One example of step 502 is router or service provider implemented DSDN system initiates a scan or monitoring of a device, subnetwork or network.

In detection step 504, method 500 utilizes third party data to determine if the device is infected. Third party data may include, but is not limited to, a report of DDOS involved computers, a report Spam involved computers, third party notifications, and computers identified during a Darknet monitoring process. One example of step 504 is a user's service provider comparing the device to one or more of the above described lists.

In detection step 506, method 500 monitors and attempts to determine if the device is infected by comparing a devices traffic and operating characteristics with a predetermined baseline device, monitoring traffic for comparison to the traffic signature of known malicious software, and/or to determine if the device is acting outside it characteristic traffic. One example of step 506 is router 106 or a service provider determining if the device is infected by comparing a device's traffic and operating characteristics with a predetermined baseline device, monitoring traffic for comparison to the traffic signature of known malicious software.

In mitigation step 508, method 500 places the device in a limited traffic or isolation subnetwork. One example of step 508 is the router of the service provider forming and placing a smart TV with malicious software into a limited access subnetwork such that the smart TV may only access Netflix and the smart TV manufacturer.

In mitigation step 510, method 500 rate limits the device. One example of step 510 is the DSDN capable router or service provider placing a smart light bulb into a traffic rate limited subnetwork such that a minimal amount of data can be sent from the smart light bulb.

Figure 6:
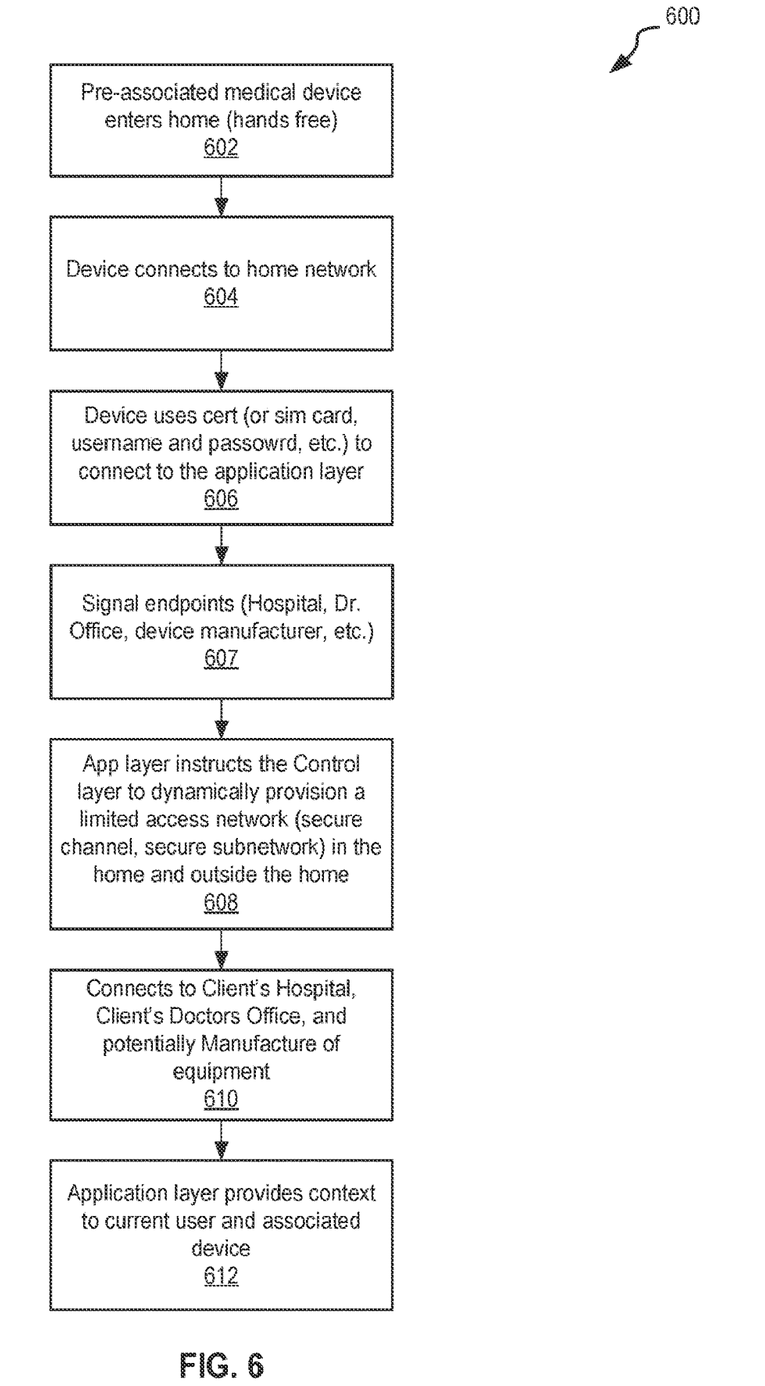
FIG. 6 shows one exemplary process for the provisioning of a headless device onto a DSDN, in an embodiment.

FIG. 6 shows a method for the provisioning of a headless device onto a DSDN. The headless device described in FIG. 6 is a medical device, such as a wirelessly capable insulin pump. It will be understood that the medical device described here is only meant to be one example of one possible headless device and not limiting in any way. Other headless devices may also be provisioned utilizing method 600 without departing from the scope herein.

In step 602 of method 600, a headless medical device enters a patient's home which is enabled with a DSDN. One example of step 602 is a patient bringing a wireless capable insulin pump into their home and powering the device on.

In step 604 of method 600, the medical device automatically connects to the DSDN. One example of step 604 is the insulin pump wirelessly connecting to the patient's DSDN.

In step 606 of method 600, the medical device utilizes a digital cert to connect to the application layer. One example of step 606 is the medical device transmitting its digital cert to router 106 of FIG. 1A or the user's service provider for processing.

In step 607 of method 600, one or more of the device, the service provider, and the medical cloud provides data regarding the endpoints for the distributed network. One example of step 607 is the router, service provider, or medical cloud identifying the patient's hospital, the patient's doctor's office, and the medical device's manufacturer as the only endpoints within the distributed network.

In step 608 of method 600, the application layer signals the control layer of the DSDN capable router to dynamically provision a limited access network or subnetwork, for example with a secure channel and/or with a secure subnetwork, in the patient's home and outside the patient's home.

That is a subnetwork is formed between two remote networks such that they operate as a single network, in this example as a medical network which includes an insulin pump in a patient's home and a medical facility or monitoring service, for example at a doctor's office, that monitors and send and transmits data to the insulin pump. This medical network may also include a medical cloud service, similar to that shown in FIG. 2, and the manufacturer of the medical device. This greatly reduces the attack surface of the insulin pump and provides important information to a medical monitoring service or doctor's office.

In step 610 of method 600, the insulin pump connects to the patient's doctor's office and/or the medical monitoring service, and potentially the manufacture of medical device. One example of step 610 is the insulin pump connecting to the patient's doctor's office such that the doctor may have real time information about the patient, to a medical monitoring service such that the patient may be monitored 24 hours a day, and to the manufacturer of the insulin pump such that any patches or updates may be timely provided, all over a secure network formed by the DSDN systems and method described herein.

In step 612 of method 600, the application layer provides context to the user, e.g., the patient, and any associated device. Providing context to the user may be providing information regarding the device's endpoints, traffic limitations, etc.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A wireless communication system, comprising:
   a software defined network (SDN) including a first subnetwork, and a second subnetwork different from the first subnetwork; and
   a router having SDN functionality, and configured to (i) operably communicate with a first device and a second device, (ii) determine a first risk level for the first device and a second risk level for the second device, (iii) provision the first device to access the SDN through the first subnetwork based on the first risk level, and (iv) provision the second device to access the SDN through the second subnetwork based on the second risk level,
   wherein the first risk level is different from the second risk level.

2. The system of claim 1, further comprising at least one switch.

3. The system of claim 2, wherein the at least one switch is one or more of a hardware component and a software component within the router.

4. The system of claim 1, wherein the SDN comprises a wireless communication network configured to operably communicate with at least one of the first and second devices over a wireless communication channel, and wherein the first subnetwork enables a higher level of device access to the SDN than the second subnetwork.

5. The system of claim 4, wherein the router is further configured to operably communicate with a third device different from the first second devices, determine a third risk level for the third device different from the first and second risk levels, and prevent the third device from accessing the SDN based on the third risk level.

6. The system of claim 5, wherein the second subnetwork enables a higher level access to the SDN for the second device than for the third device.

7. The system of claim 5, wherein the router is further configured to determine the first, second, and third risk levels through a system application layer configured to connect with the respective device.

8. The system of claim 7, wherein the router is further configured to provision the first and second devices through a system control layer configured to dynamically provision the respective device.

9. The system of claim 1, further comprising a third subnetwork including a portion of the SDN and a remote network separate from the SDN.

10. The system of claim 9, wherein the third subnetwork comprises at least one of the first subnetwork and the second subnetwork.

11. The system of claim 1, wherein the SDN further comprises a virtual private networking (VPN) tunnel to an approved network location.

12. The system of claim 11, wherein the approved network location includes one or more of an SDN cloud, a medical cloud, a medical office, a hospital, a device manufacturer, and a service provider.

13. The system of claim 11, wherein the VPN tunnel forms an isolated subnetwork within the SDN.

14. The system of claim 13, wherein the isolated subnetwork comprises a portion of a separate remote network.

15. The system of claim 1, wherein the first device is at least one of a medical device, an electronic lock, an appliance, a smart phone, a computer, a tablet, audio/visual equipment, a camera, a weather station, a motion detector, a signaling device, a smart hub, an extender, and an Internet of Things device.

16. The system of claim 1, wherein the router is further configured to provide dynamic provisioning.

17. The system of claim 16, wherein the dynamic provisioning of the first and second devices is based at least in part on a device type of the respective device.

18. The system of claim 17, wherein the router is further configured to dynamically monitor the first and second devices to reevaluate the respective first and second risk levels.

19. The system of claim 18, wherein at least one of the first and second risk levels is based on one or more an infection by malicious software, an availability of a security patch, a predetermined access level, and a predetermined limit of data flow for the respective device.

20. The system of claim 1, wherein the SDN router is further configured provision the first device to access the SDN through the second subnetwork based on the first risk level, and prevent the second device from accessing the SDN through the first subnetwork based on the second risk level.

21. The system of claim 19, wherein the SDN is further configured to (i) determine that the second risk level is based on the infection by malicious software, and (ii) provision the second subnetwork as an isolation subnetwork within the SDN.

* * * * *